United States Patent Office 2,730,515
Patented Jan. 10, 1956

2,730,515

BLENDED DIVINYL BENZENE POLYMERS

Edward A. McCracken and Allen L. Chaney, Baton Rouge, La., assignors to Esso Research and Engineering Company, a corporation of Delaware No Drawing. Application November 28, 1951,
Serial No. 258,744

3 Claims. (Cl. 260—45.5)

This invention relates to blended compositions of solid rubbery materials and, more particularly, to blends of copolymers containing critical amounts of divinyl aromatic compounds such as divinyl benzene.

In the prior art, it has been found possible to prepare a considerable number of extremely valuable copolymers of isobutylene with various of the diolefins and multiolefins such as butadiene, isoprene, dimethyl butadiene, or other multiolefins having from 4 to about 14 carbon atoms per molecule, as disclosed in Patent 2,356,128. It has also been found possible to modify the properties and especially to reduce the cold flow of such copolymers by the addition of divinyl benzene in amounts of from 0.1 up to about 4 parts per 100 parts of isobutylene, with from 2 to 30 or 40 parts, or even more, of the multiolefins also being used in the polymerization reactant feed. All of these modified polymers are, however, more or less deficient in that they show undesirable characteristics of slow extrusion rate and high extrusion swell.

Copolymers of a major proportion of an isoolefin, such as isobutylene, with a minor proportion of a diolefin, such as isoprene, are prepared by a low temperature reaction catalyzed by aluminum chloride in solution in a solvent. The resulting polymers have a Staudinger molecular weight number within the range between about 25,000 and about 80,000, and an iodine number within the range between about 1 and 10 up to 50 and are reactive with sulfur, especially in the presence of a sulfurization aid, to yield rubbery materials having a sufficient number of the physical properties of natural rubber to be an excellent replacement therefor. These materials are particularly suitable for automobile inner tubes because of the high resistance to the diffusion of air or other gases under pressure.

However, in the making of inner tubes and other such articles from these polymers, difficulty has been encountered in the successive processing steps. The polymers frequently extrude somewhat slowly and show an unreasonably great swell at the extruder die. After extrusion, the inherently high plasticity or "cold flow" of the material may also cause the extruded article to lose its shape, if it is allowed to stand for several hours at room temperature before curing. In consequence, the successive forming steps must be carried through rapidly without pause until the material is cured. This requirement is somewhat inconvenient in commercial practice; and, in spite of the utmost care, a considerable percentage of such articles must be rejected due to flaws, defects, and various failure difficulties.

According to this invention, isoolefin-diolefin copolymers can be greatly improved and highly desirable products obtained by making blends of two different isoolefin-diolefin copolymers, each of which is prepared from a feed containing critical but different proportions of divinyl aromatic monomer as a modifier.

The improvements obtained are particularly notable in better extrusion performance. Although it is not desired to limit the invention to any theory of operation, these blends of copolymers which have been modified by the inclusion of a divinyl aromatic compound, such as divinyl benzene, in the polymerization feed appear to produce their beneficial results by stiffening the polymer stock at the relatively higher extrusion temperatures. However, these additives do not appreciably affect the polymer properties at room temperature. This is a very surprising and unpredictable effect and one which can be put to an outstanding and useful application to give greatly improved properties to these synthetic polymers.

This so-called stiffening effect which the added polymers give to the base stock results in an increased extrusion rate. The base stock referred to is an interpolymer having a major proportion of combined isobutylene and a minor proportion of a combined multiolefin having 4 to 14, inclusive, carbon atoms and from 0.1 to 0.8% of a divinyl aromatic compound. This is due to the fact that the increased stiffness of the polymer permits the extruder to develop greater pressures. As a result, the modified copolymer compounds are not so soft; elasticity and nerviness at the higher processing temperatures are reduced as is shown by smoother extrusions and lower swelling values. The cold flow of the finished article upon standing is either completely removed or very greatly reduced.

The blends of this invention have been found to show superior properties as to extrusion rate and extrusion swell. The improvements obtained make the blended products greatly superior both to the base polymer and also superior in extrusion performance to polymer products prepared directly from polymerization feeds containing the same total amounts of divinyl benzene. Thus, there is an improved and enhanced effect which is unpredictable in view of the information supplied by the teaching in the art, and which is not merely additive but is the synergistic action of the final mixture of the two polymers. The most satisfactory blends contain about 1 or 2% of divinyl benzene. The properties of these blends are strikingly different from the properties of polymers prepared directly from feeds containing about the same amount of divinyl benzene.

In many cases, techniques and methods which improve cold flow properties of the isoolefin-multiolefin copolymers result in actually poorer extrusion properties of the final product. In other words, usually, poorer extrusion performance accompanies any improvement in reducing cold flow properties and there is ordinarily a limitation on the desirable extent for modification of flow properties.

The blends of this invention are prepared by admixing a major proportion of an interpolymer prepared by copolymerizing a mixture of a major proportion of isobutylene with a minor proportion of a multiolefin and an amount within the range between 0.1 to 0.8% by weight of a divinyl aromatic compound, with a minor proportion of an interpolymer prepared by copolymerizing a mixture of a major proportion of isobutylene with a minor proportion of a multiolefin and an amount within the range of 4 to 8% of a divinyl aromatic compound. Amounts of from about 1 part up to 50 parts of the 4 to 8% divinyl aromatic polymer compounds in the total, final amount of blended products can be used. The preferred range for this polymer in the blend is from 5 to 25 parts.

In the admixing of the two previously prepared copolymers, they are blended together in ny conventional blending apparatus such as a mill or Banbury mixer. The apparatus should preferably be capable of effecting an intimate mixing of the two solid, rubbery copolymer components. The blending of the polymers may be done either hot or cold and while the polymers are wet or dry. It is preferred to carry out the polymer blending to prepare the compositions of the invention while the polymer components are in a cold, dry state. In the examples shown below, the polymers were blended as dry polymers on a rubber mill at about room temperature. Blending could also be carried out in commercial practice in the water slurry system in which the polymers are prepared.

Thus, the process of the present invention comprises the preparation of a base stock from a polymerization reactant mixture of isobutylene in major proportion and a diolefin containing at least two double linkages and from 4 to 14 carbon atoms per molecule, in minor proportion, such substances as butadiene, isoprene, piperylene, dimethylbutadiene, and myrcene being particularly useful, adding to the mixture from 0.1% to about 0.8% by weight of divinyl benzene or equivalents such as divinyl aromatics and alkyl-substituted homologues, then, polymerizing the mixture at a temperature within the range between about —40° C. and —164° C. by the application to the cold mixture of a Friedel-Crafts catalyst in solution in a low-freezing non-complex-forming solvent such as aluminum chloride in solution in methyl chloride, to produce the desired polymer. The polymer is then removed from the polymerization reaction, brought up to room temperature and washed, to remove residual catalyst and to drive out dissolved or adsorbed monomers from the original mixture. A major portion of this polymer is then blended with a minor portion of a modified polymer which is prepared from the same olefins and in the same manner as that above described except that from 4 to 8% of divinyl aromatic compound is used in the feed. The resulting polymer blend is compounded with appropriate amounts of zinc oxide (stearic acid, if desired, although this is not necessary nor always desirable), carbon black, and a curing agent which may be sulfur and a sulfurization aid, or may be para quinone dioxime or may be dinitroso benzene or their analogs, homologs and equivalents. The resulting blended polymer compound may be extruded or formed into the desired tubular shape.

In making the polymers of the invention, the first major raw material is isobutylene, preferably of a purity of from 96 to 99.5%. The second important raw material is a multi-olefin containing at least two carbon to carbon double linkages. The preferred substance is isoprene but other multiolefins having from 4 to 14, inclusive, carbon atoms per molecule are usable; including such substances as butadiene, or piperylene, or dimethyl butadiene, or myrcene, or allo-ocimene, or 2-methyl-3-butyl butadiene-1,3, or 2-methyl-4-nonyl butadiene-1,3. These compounds may be described broadly as linear chain multiolefinic compounds, since each contains more than a single ethylenic or olefinic carbon to carbon double linkage. The conjugated diolefins having from 4 to 8 carbon atoms are especially preferred. With butadiene, the mixture may contain from 70 to 90 parts of isobutylene with from 30 to 10 parts of butadiene. With isoprene, the preferred range is from 95 parts to 99.5 parts of isobutylene with from 5 parts to 0.5 part of isoprene. It may be noted that most of the multiolefins do not copolymerize into the polymer in exactly the proportion in which they are present in the mixture. With butadiene and isobutylene together, approximately 30% of butadiene present causes the copolymerization of only about 1% of the butadiene into the copolymer, and accordingly, there is a change in relative concentration of butadiene and isobutylene as the reaction proceeds. Most of the other unsaturates show slightly different polymerization ratios, isoprene showing about as near a 1:1 ratio as any substance so far found.

The third essential component of the polymers is a divinyl aromatic compound, preferably a hydrocarbon, such as divinyl benzene, which acts as an auxiliary copolymerization agent capable of modifying the characteristics of the polymer produced. For the purpose of modifying the polymers, the preferred agent is divinyl benzene, but such substances as the alkyl-substituted divinyl benzenes, diisopropenyl benzene, and the divinyl naphthalenes are equally usable. The divinyl modifying agent is added to the reaction mixture of isobutylene and diolefin in a proportion as small as 0.1% for the major base stock component up to amounts as high as 8% for the minor modifying polymer component employed.

The reaction may be conducted batchwise, or in a continuous operation, in which continuing streams of cold mixed unsaturates and cold catalyst with a diluent, if used, are delivered to the reactor and an overflow of a slurry or solution of polymer is taken out for the recovery of the polymer.

The polymerization reaction is conducted within a range between 0° C. and —164° C.; preferably within the range between —40° C. or —50° C. and —110° C. The reduced temperature may be obtained by the direct admixture of a refrigerant-diluent such as liquid propane yielding about —40° C.; or solid carbon dioxide yielding about —78° C.; or liquid ethane yielding about —88° C.; or liquid ethylene yielding about —103° C. For an "internal refrigerant" it is essential that the refrigerant be free from any tendency to copolymerize, and free from any tendency to react with the catalyst.

The reduced temperature may also be obtained by a refrigerating jacket upon the reaction vessel. Any convenient refrigerant may be used in the reactor jacket including carbon dioxide, propane, especially under vacuum, ethane and ethylene, also under vacuum, or if desired, liquid methane, liquid nitrogen or liquid air, although, as a rule these latter refrigerants yield lower temperatures than are necessary. In some instances, the fluoro-chloro-organic compounds known collectively under the trade name "Freon" are also usable, depending upon the desired temperature and the particular compound available. These fluoro-chloro-organic compounds are, in some instances, also usable as internal refrigerants.

The reaction may be conducted upon the mixed unsaturates alone or it may be conducted in the presence of from ½ to 10 volumes of the diluent which may be, as above pointed out, a refrigerant diluent, or may be a simple diluent, such as ethyl or methyl chloride, or methylene or ethylene dichloride or chloroform, or ethyl trichloride, or the like. In a continuous polymerization, the diluent may consist of about 20 volumes of diluent per volume of reactants under equilibrium conditions.

The catalyst is a Friedel-Crafts active metal halide catalyst substance in solution in a low-freezing, non-complex-forming solvent. The catalyst substance may be any of the well-known Friedel-Crafts catalysts, for instance, aluminum chloride, aluminum bromide, aluminum iodide, boron fluoride, double salts ranging in composition from aluminum dichlorobromide to dialuminum pentabromo chloride, aluminum bromide-aluminyl bromide, titanium tetrachloride, titanium chloro acetate, hydroxylated aluminum halides, uranium tetrachloride, mixed alkylated aluminum halides, and other known active Friedel-Crafts compounds and their equivalents. Aluminum chloride is usually the preferred catalytic substance with aluminum bromide and titanium tetrachloride just about as satisfactory. Boron trifluoride in solution is satisfactorily usable with some of the diolefins.

For the catalyst solvent, it is only necessary that the solvent shall have a freezing point below 0° C. although it is usually convenient to use a catalyst solvent having a freezing point below the polymerization temperature. These requirements are met by any solvent which is low-freezing, that is, having a freezing point below the freezing point of water. It is also essential that the solvent be non-complex-forming, meaning thereby that there does not separate from the solution, on evaporation of the solvent, a compound between the solvent and the Friedel-Crafts catalyst, and that upon the addition of solvent in the form of a vapor or liquid to the catalyst at constant temperature, there shall be a substantially continuous change in the composition of the catalyst phase and a continuous increase in the partial pressure of the solvent. In general, the catalyst can be recovered unchanged by removal of the solvent. The preferred catalyst solvents with aluminum chloride are ethyl and methyl chloride or methylene or ethylene dichloride or chloroform, or occasionally, propyl chloride or carbon disulfide or sulfuryl chloride, or the like. With aluminum bromide or boron trifluoride the same solvents are advantageously usable and, in addition, the lower-freezing hydrocarbons such as liquid propane, liquid ethane, liquid butane, liquid heptane, liquid hexane, and the like are also usable.

In each case, the polymerization reaction is conducted on the mixture in the usual way to yield the desired polymer. At the low temperatures above indicated, the reaction proceeds to the production of the polymers. The exact character of the reaction is still unknown and it is not as yet known how the divinyl benzene co-reacts, nor is it known what the method of reaction is. However, amounts of the divinyl benzene type substance as small as 0.1% in the reactant feed exert a marked influence on the physical properties of the copolymer obtained and, an even more important influence on the blends obtained from such copolymers. Large amounts of the divinyl aromatic compound apparently have a different effect than do small amounts, small amounts giving a small amount of cross linking and having one effect, while larger amounts give larger amounts of cross linking and have a different effect.

In measuring the cold flow properties of a plastic polymer, polymer compounded with carbon black and other materials if desired is formed into cylindrical rods about ½ inch in diameter by extrusion through a die using a laboratory extruder. The rods are cut with a hot knife to give cylindrical pellets about ½ inch diameter by ½ inch height. Pellets are dusted with talc and pre-heated in an air oven at 104° F. for 15 minutes. The pellet is then measured for height and placed on the lower platen of a Williams plastometer. The upper platen with weight adjusted to give 1.81 kg. per cm.$^2$ is lowered onto the pellet for 3 minutes. At the end of 3 minutes the compressed height is measured and the weight removed. The pellet is allowed to recover for 20 minutes in the air oven and the final recovered height measured.

Total deformation, percent =

$$\frac{\text{orig. ht. minus compressed ht.} \times 100}{\text{orig. ht.}}$$

Cold flow, percent =

$$\frac{\text{orig. ht. minus recovered ht.} \times 100}{\text{orig. ht.}}$$

It will be noted that this procedure measures the change in height due to flow at 104° F. and avoids any question of elastic deformation which may not be rapidly recovered. It is found that this measurement method is an excellent means for determining the resistance of the polymer to plastic flow and to change of shape during standing at room temperature in plant process.

In measuring the extrusion rate, a small or laboratory type extruder consisting of power-driven worm operating within a casing with a die at the outlet end is used, and the rate in inches per minute at which the polymer can be forced through the die without the production of irregular or erratic product is measured. The extruder usually has a steam-jacketed barrel and the extrusion is conducted at a temperature of about 220° F. The number of inches of tube which can be extruded in one minute is then measured and this measurement is an excellent indication of the rate at which the polymer can be extruded in plant practice.

The amount of "swell" is determined by measurement of the grams weight per inch of a tube extruded through a standard die operated in the above outlined manner. The standard die has an 0.4″ diameter opening and an 0.3″ diameter core so as to give an extruded tube of 0.4″ outside diameter and an 0.3″ inside diameter and a value of 1.03 grams per inch if no "swell" occurred. The weight of 1″ of the tube extruded from this die is the "swell."

The invention is illustrated by the following examples which describe a number of embodiments of the invention although it is not intended to limit the invention thereto.

EXAMPLE

A polymerization mixture was prepared containing about 97 parts of isobutylene, 3 parts of isoprene, and 0.4 part of divinyl benzene. This mixture was cooled by a liquid ethylene cooling jacket to approximately −103° C. (the temperature tends to range between −95° C. and −102° C.) and there was added to the mixture approximately 3 volumes of methyl chloride. When the mixture had been fully cooled to the desired temperature, it was polymerized by the addition of approximately 25 parts of an 0.2% solution of aluminum chloride in methyl chloride; this amount being sufficient to cause the polymerization of about 54% of the unsaturates present.

Two other polymerization mixtures were prepared, one containing 4% divinyl benzene, 3% isoprene, and 93% isobutylene, and the other containing 8% divinyl benzene, 3% isoprene, and 89% isobutylene. These were similarly polymerized by similar amounts of catalyst solution. After the polymerization step, each of the polymerized mixtures was discharged into warm water to volatilize out the methyl chloride and the unpolymerized unsaturates and the polymer was then brought up to room temperature, dried, and compounded. Blends of polymers were prepared using 80% of the low divinyl benzene product with about 20% of each of the products from larger amounts of divinyl benzene.

The samples were extruded in the standard extruder to determine the extrusion rate and swell. Measurements of cold flow of the samples were made on pellets which were compressed for three minutes under a load of 1.81 kg. per cm.$^2$ at 104° F. For the tests, portions of each of the polymers were compounded with carbon black according to the following recipe:

| | Parts |
|---|---|
| Polymer | 100 |
| Wyex carbon black | 20 |
| Gastex carbon black | 30 |

The extrusion and flow properties of the base polymer and of the blends of the base polymer with the high divinyl benzene polymers as well as the properties of a regular isobutylene-isoprene copolymer (GR-I) are shown in the table below.

*Table*

POLYMER BLENDS CONTAINING DIVINYL BENZENE

| Polymer Sample | 1 | 2 | 3 | 4 | 5 | 6 |
|---|---|---|---|---|---|---|
| Isobutylene-Isoprene +0.4% Divinyl Benzene (base stock) | 100 | 80 | 80 | | | |
| Isobutylene-Isoprene +4% Divinyl Benzene | | 20 | | | | |
| Isobutylene-Isoprene +8% Divinyl Benzene | | | 20 | | | |
| Isobutylene-Isoprene (GR-I) | | | | 100 | | |
| Isobutylene-Isoprene +2.0% Divinyl Benzene | | | | | 100 | |
| Isobutylene-Isoprene +1.0% Divinyl Benzene | | | | | | 100 |
| Extrusion: | | | | | | |
| Rate, In. per Min | 36 | 38 | 42 | 44 | 25 | 30.5 |
| Swell, g. per In | 2.58 | 2.47 | 2.37 | 2.21 | 2.72 | 2.79 |
| Appearance | Smooth | Smooth | Smooth | Smooth | Int. | Int. |
| Flow Properties: | | | | | | |
| Total deformation, percent | 47.7 | 46.5 | 42.4 | 44.9 | 46.1 | 48.6 |
| Flow, percent | 15.0 | 13.4 | 12.0 | 23.3 | 5.1 | 11.9 |

It can be seen from the above data that the blends prepared from a major proportion of base stock containing 0.4% divinyl benzene with minor proportions of modifying polymers having from 4% to 8% divinyl benzene show greatly improved characteristics of extrusion rate and reduced swell. In fact, the extrusion rate and swell of the blend containing the 8% divinyl benzene polymer approaches the values of these properties of the GR-I product itself. In addition, the cold flow of the blends is in every case, much lower than that shown by the GR-I, the blend containing 8% divinyl benzene having only about one-half the cold flow of the GR-I. It can also be seen from the above data that the properties of the blends, samples 2 and 3, having a total of about 1 to 2% divinyl benzene, show them to be much superior to polymers prepared directly with 1 to 2 parts of divinyl benzene such as samples 5 and 6. Thus, the blends have much higher extrusion rates and lower swell values.

What is claimed is:

1. A blended polymer composition consisting of 95 to 75 parts of synthetic, solid, plastic hydrocarbon interpolymer of 95 to 99.5 parts of isobutylene with 5 to 0.5 parts of isoprene and from 0.1 to 0.8% of divinyl benzene, the polymer being characterized by a low unsaturation indicated by an iodine number within the range between 1 and 50, a molecular weight above 25,000, and reactivity with sulfur to yield an elastic product; in admixture with about 5 to 25 parts by weight of a synthetic, solid, plastic hydrocarbon interpolymer of 95 to 99.5 parts of isobutylene with 5 to 0.5 parts of isoprene and from 4 to 8% of divinyl benzene, the polymer being characterized by a molecular weight above 25,000, and reactivity with sulfur to yield an elastic product, the mixture having an average of about 1 to 2% of divinyl benzene and being characterized by a lower cold flow, a higher extrusion rate, and a lower swell after extrusion, than has a single tripolymer of the same average percent divinyl benzene.

2. A blended polymer composition consisting of 80 parts of a synthetic, solid, plastic hydrocarbon interpolymer prepared by polymerizing about 96.6 parts of isobutylene, 3 parts of isoprene, and 0.4 part of divinyl benzene; in admixture with 20 parts of a synthetic, solid, plastic, hydrocarbon interpolymer prepared by polymerizing about 89 parts of isobutylene, 3 parts of isoprene and 8.0 parts of divinyl benzene, the blended composition being characterized by an extrusion rate of about 42 inches per minute, and a cold flow of about 12.0%.

3. A blended polymer composition consisting of 80 parts of a synthetic, solid, plastic hydrocarbon interpolymer prepared by polymerizing about 96.6 parts of isobutylene, 3 parts of isoprene, and 0.4 part of divinyl benzene; in admixture with 20 parts of a synthetic, solid, plastic, hydrocarbon interpolymer prepared by polymerizing about 89 to 93 parts of isobutylene, 3 parts of isoprene and 4.0 to 8.0 parts of divinyl benzene, the blended composition being characterized by an extrusion rate of about 38 to 42 inches per minute, and a cold flow of about 12 to 13%.

References Cited in the file of this patent

UNITED STATES PATENTS

| | | |
|---|---|---|
| 2,356,128 | Thomas et al. | Aug. 22, 1944 |
| 2,474,807 | Schoene | July 5, 1949 |
| 2,577,822 | Sparks et al. | Dec. 11, 1951 |
| 2,701,895 | Tawney et al. | Feb. 15, 1955 |